(12) United States Patent
Mazzola et al.

(10) Patent No.: US 8,664,337 B2
(45) Date of Patent: *Mar. 4, 2014

(54) THICK BLOWN FILMS

(75) Inventors: Nicolas Mazzola, Jundiai (BR); Jorge Gomes, Sao Paulo (BR); Maria Pollard, Pearland, TX (US); Michael Turner, Sugar Land, TX (US)

(73) Assignee: Dow Global Technologies LLC and Dow Brasil S.A., Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/515,828

(22) PCT Filed: Jan. 11, 2011

(86) PCT No.: PCT/US2011/020850
§ 371 (c)(1),
(2), (4) Date: Sep. 7, 2012

(87) PCT Pub. No.: WO2011/085377
PCT Pub. Date: Jul. 14, 2011

(65) Prior Publication Data
US 2013/0022804 A1 Jan. 24, 2013

Related U.S. Application Data

(63) Continuation of application No. 12/685,148, filed on Jan. 11, 2010.

(51) Int. Cl.
| | | |
|---|---|---|
| *C08F 8/00* | (2006.01) | |
| *C08F 10/02* | (2006.01) | |
| *C08K 5/32* | (2006.01) | |
| *C08L 23/26* | (2006.01) | |
| *C08L 23/04* | (2006.01) | |
| *C08J 5/18* | (2006.01) | |
| *C08F 8/30* | (2006.01) | |
| *C08K 5/3435* | (2006.01) | |
| *C08F 210/16* | (2006.01) | |
| *C08F 110/02* | (2006.01) | |
| *C08J 3/22* | (2006.01) | |

(52) U.S. Cl.
USPC .......................................... 525/194; 525/240

(58) Field of Classification Search
USPC ................................................ 525/194, 240
See application file for complete search history.

(56) References Cited

U.S. PATENT DOCUMENTS

| | | | |
|---|---|---|---|
| 4,390,666 A | 6/1983 | Moriguchi et al. | |
| 4,603,173 A | 7/1986 | Mack et al. | |
| 5,486,575 A | 1/1996 | Shroff | |
| 6,706,822 B2 | 3/2004 | Guenther et al. | |
| 6,984,698 B2 | 1/2006 | McLeod et al. | |
| 7,579,411 B2 | 8/2009 | Roth et al. | |
| 2003/0236328 A1 | 12/2003 | McLeod et al. | |
| 2005/0197433 A1 | 9/2005 | Roth et al. | |
| 2008/0146740 A1 | 6/2008 | Roth et al. | |
| 2008/0199673 A1 | 8/2008 | Allgeuer et al. | |
| 2009/0209158 A1 | 8/2009 | Richeson et al. | |
| 2010/0210800 A1 | 8/2010 | Roth et al. | |
| 2011/0171407 A1* | 7/2011 | Mazzola et al. | 428/36.9 |
| 2012/0283390 A1* | 11/2012 | Demirors et al. | 525/194 |
| 2013/0035444 A1* | 2/2013 | Karjala et al. | 525/180 |

OTHER PUBLICATIONS

Scaffaro et al, "Effect of the additive level and of the processing temperature on the re-building of post-consumer pipes from polyethylene blends" (European Polymer Journal, vol. 43, No. 7, pp. 2947-2955 (Jul. 2007).*
Scaffaro et al, "On the effectiveness of different additives and concentrations on the re-building of the molecular structure of degraded polyethylene" (Polymer Degradation and Stability, vol. 91, No. 12, pp. 3110-3116 (Dec. 1, 2006).*
Scafforo R, et al, On the Effectiveness of Different Additives and Concentrations on the Re-Building of the Molecular Structure of Degraded Polyethylene, Polymer Degradation and Stability, Dec. 2006 vol. 91, No. 12, 1 XP025095966.
Scaffaro R, et al, Effect of the Additive Level and of the Processing Temperature on the Re-Building of Post-Consumer Pipes from Polyethylene Blends, European Polymer Journal, pp. 2947-2955, 2007, XP002633405.
PCT/ US2011/020850, International Search Report.
PCT/ US2011/020850, International Preliminary Report on Patentability.
PCT/ US2011/020850, Written Opinion of the International Searching Authority.
PCT/ US2011/020853, International Preliminary Report on Patentability.
PCT/ US2011/020853, International Search Report.
PCT/ US2011/020853, Written Opinion of the International Searching Authority.
La Mantia, F P, et al, Processability and Properties of Re-Graded, Photo-Oxidized Post-Consumer Greenhouse Films, Macromolecular Materials and Engineering, Jun. 28, 2005, pp. 970-975, vol. 290.
La Mantia F P, et al., Re-Gradation of Photo-Oxidized Post-Consumer Greenhouse Films, Macromolecular Rapid Communications, Dec. 16, 2004, pp. 361-364, vol. 26.

* cited by examiner

*Primary Examiner* — Nathan M Nutter

(57) ABSTRACT

The present invention is a film having a thickness greater than 100 microns comprising from 10 to 100 percent by weight of a polyethylene polymer made by the process of a) selecting a target polyethylene resin having a density, as determined according to ASTM D792, in the range of from 0.90 g/cm3 to 0.955 g/cm3, and a melt index, as determined according to ASTM D1238(2.16 kg, 190 C), in the range of from 0.01 g/10 min to 10 g/10 min; b) reacting said target polyethylene with an alkoxy amine derivative in an amount less than 900 parts derivative per million parts by weight of total polyethylene resin under conditions sufficient to increase the melt strength of the target polyethylene resin; and c) forming a thick film from the modified target resin. The present films include those which can achieve similar processability as those containing unmodified linear polyethylene despite having at least 10% less LDPE resins in the formulation.

14 Claims, 2 Drawing Sheets

THICK BLOWN FILMS

CROSS-REFERENCE TO RELATED APPLICATIONS

This application claims priority from U.S. patent application Ser. No. 12/685,148, filed Jan. 11, 2010, the disclosure of which is incorporated herein by reference for purposes of U.S. practice.

BACKGROUND AND SUMMARY OF THE INVENTION

Polyethylene has desirable properties that have helped to make it the highest volume polymer manufactured. Polyethylene can be made in different processes in order to give different properties. Known families of polyethylene include high density polyethylene (HDPE), linear low density polyethylene (LLDPE), and low density polyethylene made using high pressure reactors (LDPE). Within these broad classes many variations exist resulting from different types of polyolefin process technologies (for example, solution, slurry or gas phase) or from the use of different catalysts (for example, Ziegler-Natta or constrained geometry catalysts). The desired application requires a careful balance of rheological properties which will lead a person of skill in the art to select one type of polyethylene over another. In many applications, such as blow-molding and blown film applications, melt strength of the polyethylene is a key parameter, frequently measured as elongational viscosity of the polymer.

The melt strength is a practical measurement that can predict material performance when submitted to elongational deformations. In melt processing good melt strength is important to maintain stability during processes such as coating, blown film production, fiber spinning and foamed parts.

Melt strength is related to several processing parameters such as bubble stability and therefore thickness variation during blown film production; parison formation during blow molding; sagging during profile extrusion; cell formation during foaming; more stable thickness distribution during sheet/film thermoforming.

This property can be enhanced by using resins with higher molecular weight, but such resins will generally require more robust equipment and more energy use because they tend to generate higher extrusion pressure during the extrusion process. Therefore, properties must be balanced to provide an acceptable combination of physical properties and processability.

In thick film applications, such as for use in silage applications, blends of LDPE and LLDPE are typically used in order to obtain a balance of processability (extruder amps and pressure) and film mechanical properties. In this blend the LDPE component is the processability component whereas the LLDPE is the mechanical end component. Therefore, the ability to decrease the LDPE portion of the blend should increase the mechanical properties of the blend. Through this invention, the ability to increase the melt strength of the LLDPE component allows the use of a higher percentage of LLDPE in the blend, thus increasing the mechanical properties without sacrificing processability.

Accordingly, one aspect of the invention is a film particularly well suited for thick film applications. For purposes of the present invention a "thick film" is one having an average thickness of at least 100 microns, and for many applications one having an average thickness of greater than 200 microns. The films of the present invention comprise a polyethylene which has been reacted with an alkoxy amine derivative through regular extrusion processing.

Accordingly, one aspect of the invention is a film having a thickness greater than 200 microns comprising a polyethylene polymer made by the process of first selecting a target polyethylene resin having a density, as determined according to ASTM D792, in the range of from 0.90 g/cm3 to 0.955 g/cm3, and a melt index, as determined according to ASTM D1238 (2.16 kg, 190° C.), in the range of from 0.01 g/10 min to 10 g/10 min. Then the target polyethylene is reacted with an alkoxy amine derivative in an amount less than 900 parts derivative per million parts by weight of total polyethylene resin under conditions sufficient to increase the melt strength of the target polyethylene resin. This modified target resin is then combined with an amount of low density polyethylene prepared in a high pressure process, and the blended resin is then used to make a film.

The modified target resins for use in the present invention increase the elongational viscosity at low (0.1 s$^{-1}$) shear rates while maintaining the viscosity at higher shear rates (>100 s$^{-1}$) such that the ease of processing of the material is maintained at typical extrusion conditions. One aspect of the invention is that the extruder pressure does not increase more than 10% of the comparative resin upon processing the inventive resin at the same operating conditions.

DETAILED DESCRIPTION OF THE INVENTION

Figure 1:
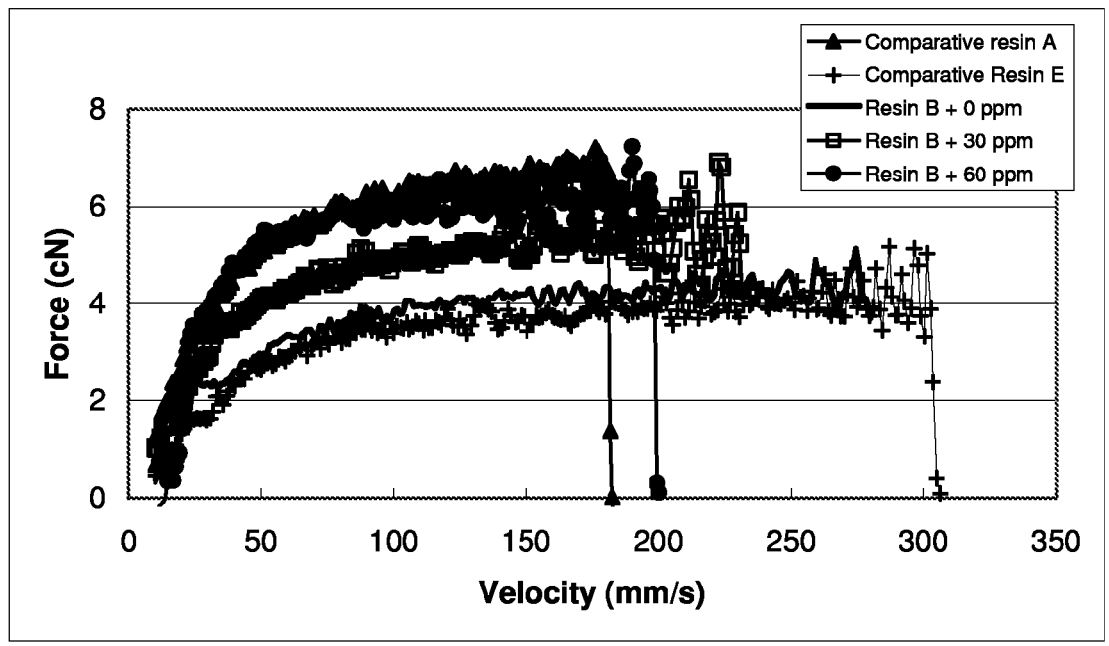
FIG. 1 shows the melt strength curve versus stretching velocity with increasing additive concentration.

In its broadest sense, the present invention is a film having a thickness greater than 200 microns comprising:
  a) from 10 to 100 percent by weight of a polyethylene polymer made by the process of:
    i) selecting a target polyethylene resin having a density, as determined according to ASTM D792, in the range of from 0.90 g/cm3 to 0.955 g/cm3, and a melt index, as determined according to ASTM D1238 (2.16 kg, 190° C.), in the range of from 0.01 g/10 min to 10 g/10 min;
    ii) reacting said target polyethylene with an alkoxy amine derivative in an amount less than 900 parts derivative per million parts by weight of total polyethylene resin under conditions sufficient to increase the melt strength of the target polyethylene resin; and
  b) from 0 to 90 percent by weight of a low density polyethylene composition.

Polyethylene resin includes all polymers or polymer blends which are derived at least 50% by weight from ethylene monomer units. This includes materials known in the art as high density polyethylene (HDPE), linear low density polyethylene (LLDPE) (including Ziegler-Natta linear low density polyethylene (LLDPE), metallocene polyethylene, and multiple reactor polyethylene ("in reactor" blends of Ziegler-Natta PE and metallocene PE, such as products disclosed in U.S. Pat. No. 6,545,088 (Kolthammer, et al.); U.S. Pat. No. 6,538,070 (Cardwell, et al.); U.S. Pat. No. 6,566,446 (Parikh, et al.); U.S. Pat. No. 5,844,045 (Kolthammer, et al.);

U.S. Pat. No. 5,869,575 (Kolthammer, et al.); and U.S. Pat. No. 6,448,341 (Kolthammer, et al.)), and low density polyethylene made using high pressure reactors (LDPE).

The target polyethylene resin selected should have a density, as determined according to ASTM D792, in the range of from 0.865 g/cm3 to 0.962 g/cm3, more preferably from 0.905 g/cm3 to 0.957 g/cm3 and a melt index, as determined according to ASTM D1238 (2.16 kg, 190° C.), in the range of from 0.01 g/10 min to 100 g/10 min, more preferably 0.1 g/10 min to 15 g/10 min. Suitable target polyethylene resins can be produced with conventional Ziegler Natta or Chromium catalysts but also with metallocene or single site catalysts. Such resins may have monomodal or multimodal molecular weight distributions.

Once a target polyethylene resin is selected, it is reacted with an alkoxy amine derivative. For purposes of the present invention "alkoxy amine derivatives" includes nitroxide derivatives. The alkoxy amine derivative is added in an amount and under conditions sufficient to increase the melt strength of the polyethylene resin. The alkoxy amine derivatives correspond to the formula:

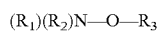

$(R_1)(R_2)N{-}O{-}R_3$ where $R_1$ and $R_2$ are each independently of one another, hydrogen, $C_4$-$C_{42}$ alkyl or $C_4$-$C_{42}$ aryl or substituted hydrocarbon groups comprising O and/or N, and where $R_1$ and $R_2$ may form a ring structure together; and where $R_3$ is hydrogen, a hydrocarbon or a substituted hydrocarbon group comprising O and/or N. Preferred groups for $R_3$ include —$C_1$-$C_{19}$alkyl; —$C_6$-$C_{10}$aryl; —$C_2$-$C_{19}$alkenyl; —O—$C_1$-$C_{19}$alkyl; —O—$C_6$-$C_{10}$aryl; —NH—$C_1$-$C_{19}$alkyl; —NH—$C_6$-$C_{10}$aryl; —N—($C_1$-$C_{19}$alkyl)$_2$. $R_3$ most preferably contains an acyl group.

The preferred compound may form nitroxylradical (R1)(R2)N—O* or amynilradical (R1)(R2)N* after decomposition or thermolysis.

A particularly preferred species of alkoxy amine derivative is 9-(acetyloxy)-3,8,10-triethyl-7,8,10-trimethyl-1,5-dioxa-9-azaspiro[5.5]undec-3-yl]methyl octadecanoate which has the following chemical structure:

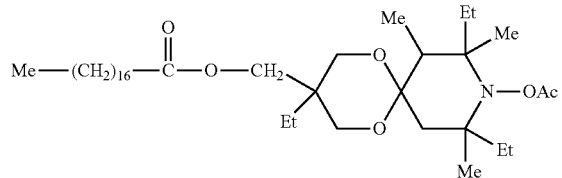

Examples of some preferred species for use in the present invention include the following:

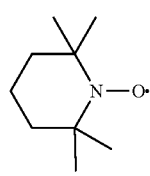
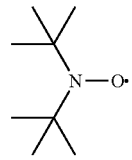
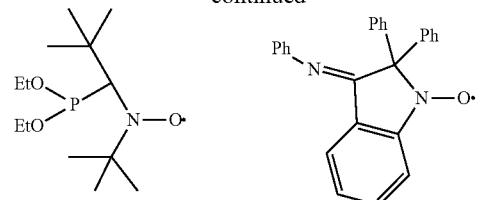
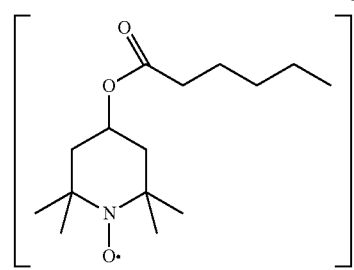
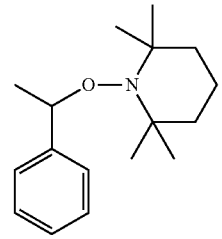
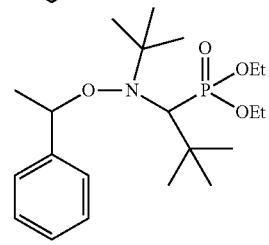
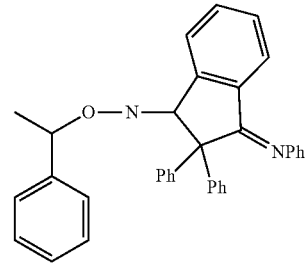

In general hydroxyl amine esters are more preferred with one particularly favored hydroxyl amine ester being 9-(acetyloxy)-3,8,10-triethyl-7,8,10-trimethyl-1,5-dioxa-9-azaspiro[5.5]undec-3-yl]methyl octadecanoate.

The alkoxy amine derivatives are added in an amount sufficient to increase the melt strength and/or increase the viscosity to the desired level. In general the alkoxy amine derivatives are added in an amount of from 1 to 900 ppm of the total amount of polyethylene polymer by weight (that is from 1 to 900 parts alkoxy amine derivative per million parts of target resin plus carrier resin, if any), preferably from 15 to 600 ppm, more preferably from 25 to 400 ppm and still more preferably from 30 to 200 ppm.

The addition to the polyethylene polymer can be carried out in all customary mixing machines in which the polymer is melted and mixed with the additives. Suitable machines are known to those skilled in the art. They are predominantly mixers, kneaders and extruders.

The process is preferably carried out in an extruder by introducing the additive during processing. Particularly preferred processing machines are single-screw extruders, contra rotating and co rotating twin-screw extruders, planetary-gear extruders, ring extruders or co-kneaders. Suitable extruders and kneaders are described, for example, in Handbuch der Kunststoftextrusion, Vol 1 Grundlagen, Editors F. Hensen, W. Knappe, H. Potente, 1989, pp. 3-7, ISBN.3-446-14339-4 (Vol 2 Extrusionsanlagen 1986, ISBN 3-446-14329-7). For example, the screw length can be 1-60 times the screw diameter, preferably 35-48 times the screw diameters. The rotational speed of the screw is preferably 10-600 rotations per minute (rpm), more preferably 25-300 rpm. It is also possible to first prepare a concentrated mixture of the additive in a carrier polyethylene resin, preferably at 1000 to 10000 ppm, and then introduce this concentrate, or "masterbatch", via an extruder into a melted polyethylene using a static mixer to blend the two materials, preferably at 1 to 20 wt % of the concentrate in the melted resin. The concentrate could be processed in an extruder, preferably at temperatures from 180 to 240° C. The temperatures in the static mixer could range from 200 to 250° C., with a residence time in the mixer ranging from 1 to 10 minutes.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components is added, these can be premixed or added individually.

The polymers need to be subjected to an elevated temperature for a sufficient period of time, so that the desired changes occur. The temperature is generally above the softening point of the polymers. In a preferred embodiment of the process of the present invention, a temperature range lower than 280° C., particularly from about 160° C. to 280° C. is employed. In a particularly preferred process variant, the temperature range from about 200° C. to 260° C. is employed.

The period of time necessary for reaction can vary as a function of the temperature, the amount of material to be reacted and the type of, for example, extruder used. It is usually from about 10 seconds to 30 minutes, in particular from 20 seconds to 20 minutes.

The alkoxy amine derivative can advantageously be added to the mixing device by use of a masterbatch. As will be appreciated by those of ordinary skill in the art, the carrier resin for the masterbatch should be chosen to be compatible with the resin to be modified. LDPE high pressure low density polyethylene polymers (referred to in the industry as "LDPE") were unexpectedly found to be the preferred carrier due to the lower reactivity as evidenced by little variation of the extrusion pressure during masterbatch production. HDPE may be a better carrier as it will react even less because it does not have tertiary carbons and very low trisubstituted unsaturation unit/1,000,000 C.

Another advantage of this invention is the discovery that polypropylene is not a good carrier for this additive, as it tends to degrade at typical processing temperatures. Another discovery is that the carrier resin should be substantially free of any antioxidant additives, preferably having less than 1,000 ppm of antioxidant additives, as they tend to suppress the activity of the additive.

The preferred carrier resin should be compatible with the application at hand; it should have similar viscosity with the target polyethylene resin with which it is going to be blended. It should be preferably an LDPE or HDPE resin with minimal trisubstituted unsaturation units, preferably fewer than 70 per 1,000,000 carbons. The preferred carrier resin should have a molecular weight (Mn) that is less than 50,000 so that it is easy to process, as demonstrated by the pressure drop through the extruder. The carrier resin could incorporate other additives for processing aids but it should preferably be substantially free of antioxidant compounds, preferably containing less than 1,000 ppm of any antioxidant compound, preferably less than 500 ppm, more preferably less than 100 ppm by weight.

The target polyethylene resin could be a copolymer of ethylene with any alkene monomer containing 3 to 12 carbons. Preferably, the target polyethylene resin should have a level of trisubstituted unsaturation units per 1,000,000 carbons ranging from 200 to 450. It should have a molecular weight slightly slower than the carrier resin, as indicated by the melt index (g/10 min). Preferably, the melt index of the target polyethylene resin should be higher by 0.2-0.5 units (g/10 min) than the final desired resin. Preferably, the polyethylene resin should contain minimal or no antioxidant additives, and any additives should be well-dispersed in the resin prior to being blended with the carrier resin.

The amount of the active alkoxy amine derivative material in the carrier resin should be in the range of 0.1 to 30% by weight, preferably from 0.1 to 5%, and more preferably in the range of 0.2 to 1%. The amount of the masterbatch is added so that the alkoxy amine derivative is added to the target product in the range of 10 to 900 ppm, preferably from 15 to 600 ppm, more preferably from 25 to 400 ppm and still more preferably from 30 to 200 ppm. It will readily be understood by one of skill in the art that the amount of alkoxy amine derivative in the final product will be reduced as the compound reacts with the target and carrier polyethylene.

Preferably, the amount of the active ingredient should be kept below 1000 ppm to minimize reaction in the carrier resin, reduce the potential for gels in the final product, and be substantially reacted out in the final product so that the final product remains stable with further processing. It should be understood that after the alkoxy amine derivative has been allowed to react with the target resin, it may be desirable to add one or more antioxidant additives, to protect the properties of the modified target resin. One way to accomplish this is to blend the resin after reaction with the alkoxy amine derivative with another resin that is rich in antioxidants.

The modified target polyethylene should comprise from 10 to about 100% by weight of the film. A second optional component of the film is an LDPE resin, which can comprise from 0 to 90% of the film. One of the advantages of the present invention is the ability to reduce the amount of LDPE while still maintaining the desired mechanical properties of the film, so in preferred embodiments the film will comprise less than 25%, preferably less than 10% and even more preferably less than 5% by weight LDPE.

Such low density polyethylene composition may have a density in the range of from 0.910 g/cm$^3$ to 0.940 g/cm$^3$; for example, from 0.915 g/cm$^3$ to 0.935 g/cm$^3$, and a melt index ($I_2$) in the range of from 0.1 to 5 g/10 minutes; for example, from 0.2 to 2 g/10 minutes. The target resin (which may itself be a blend including LDPE) may advantageously first be reacted with the alkoxy amine derivative and then blended with the LDPE.

Uses

The ethylenic polymer may be employed in a variety of conventional thermoplastic fabrication processes to produce useful articles, including objects comprising at least one film layer, such as a monolayer film, or at least one layer in a multilayer film prepared by cast, blown, calendered, or extrusion coating processes.

Additives and adjuvants may be added to the ethylenic polymer post-formation. Suitable additives include fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; and other natural and synthetic polymers, including other polymers that are or can be made according to the embodiment methods.

The film may also comprise additional components so that the film comprises bends or mixtures of the ethylenic polymers with other polyolefins. Suitable polymers for blending with the ethylenic polymers described above include thermoplastic and non-thermoplastic polymers including natural and synthetic polymers. Exemplary polymers for blending include various types of polyethylene, including high pressure, free-radical low density polyethylene (LDPE), Ziegler-Natta linear low density polyethylene (LLDPE), metallocene PE, including multiple reactor PE ("in reactor" blends of Ziegler-Natta PE and metallocene PE, such as products disclosed in U.S. Pat. No. 6,545,088 (Kolthammer, et al.); U.S. Pat. No. 6,538,070 (Cardwell, et al.); U.S. Pat. No. 6,566,446 (Parikh, et al.); U.S. Pat. No. 5,844,045 (Kolthammer, et al.); U.S. Pat. No. 5,869,575 (Kolthammer, et al.); and U.S. Pat. No. 6,448,341 (Kolthammer, et al.)).

The ethylenic polymer maybe employed as resin for thick films. Surprisingly, the additive has shown to improve the melt strength of the inventive resins while having better processability than resins with similar melt strength, as indicated by the energy required in an extruder in processing the material into films. When this ethylenic polymer is blended with LDPE resins it exhibits melt strength higher than the equivalent blend that does not contain the additive.

Test Methods
Density

Samples that are measured for density are prepared according to ASTM D 1928. Measurements are made within one hour of sample pressing using ASTM D792, Method B.

Melt Index

Melt index, MI or $I_2$, is measured in accordance with ASTM D 1238, Condition 190° C./2.16 kg, and is reported in grams eluted per 10 minutes. $I_{10}$ is measured in accordance with ASTM D 1238, Condition 190° C./10 kg, and is reported in grams eluted per 10 minutes.

Melt Strength

Melt strength is measured at 190° C. using a Goettfert Rheotens 71.97 (Goettfert Inc.; Rock Hill, S.C.), melt fed with a Goettfert Rheotester 2000 capillary rheometer equipped with a flat entrance angle (180 degrees) of length of 30 mm and diameter of 2 mm. The pellets are fed into the barrel (L=300 mm, Diameter=12 mm), compressed and allowed to melt for 10 minutes before being extruded at a constant piston speed of 0.265 mm/s, which corresponds to a wall shear rate of 38.2 $s^{-1}$ at the given die diameter. The extrudate passes through the wheels of the Rheotens located at 100 mm below the die exit and is pulled by the wheels downward at an acceleration rate of 2.4 $mm/s^2$. The force (in cN) exerted on the wheels is recorded as a function of the velocity of the wheels (in mm/s). Melt strength is reported as the plateau force (cN) before the strand broke.

Dynamic Mechanical Spectroscopy

Elongational viscosity is measured using the Dynamic Mechanical Spectroscopy (DMS) method. Dynamic oscillatory shear measurements are performed with the ARES system of TA Instruments (New Castle, Del.) at 190° C. using 25 mm parallel plates at a gap of 2.0 mm and at a constant strain of 10% under an inert nitrogen atmosphere. The frequency interval is from 0.1 to 100 radians/second at 5 points per decade logarithmically spaced. The stress response is analyzed in terms of amplitude and phase, from which the storage modulus (G'), loss modulus (G"), complex modulus (G*), tan δ, phase angle δ and complex viscosity (η*) are calculated. The strain amplitude is constant at 10%. The stress response is analyzed in terms of amplitude and phase, from which the storage modulus (G'), loss modulus (G"), complex modulus (G*), dynamic viscosity ($\square$*), and tan ($\square$) or tan delta are calculated. For sample preparation, resins are compression-molded into 3 mm thick×25 mm diameter circular plaque at 177° C. for 5 minutes under 10 MPa pressure in air then cooled.

Gel Permeation Chromatography

The Triple Detector Gel Permeation Chromatography (3D-GPC or TD-GPC) system consists of a Waters (Milford, Mass.) 150° C. high temperature chromatograph (other suitable high temperatures GPC instruments include Polymer Laboratories (Shropshire, UK) Model 210 and Model 220 equipped with an on-board differential refractometer (RI). Additional detectors can include an IR4 infra-red detector from Polymer ChAR (Valencia, Spain), Precision Detectors (Amherst, Mass.) 2-angle laser light scattering (LS) detector Model 2040, and a Viscotek (Houston, Tex.) 150R 4-capillary solution viscometer. A GPC with these latter two independent detectors and at least one of the former detectors is sometimes referred to as "3D-GPC or TD-GPC" while the term "GPC" alone generally refers to conventional GPC. Depending on the sample, either the 15° angle or the 90° angle of the light scattering detector is used for calculation purposes. Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of butylated hydroxytoluene (BHT) in trichloro benzene (TCB). Both solvents are sparged with nitrogen. The polyethylene samples are gently stirred at 160° C. for four hours. The injection volume is 200 microliters. The flow rate through the GPC is set at 1 ml/minute.

The GPC column set is calibrated by running 21 narrow molecular weight distribution polystyrene standards. The molecular weight (MW) of the standards ranges from 580 to 8,400,000, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to or greater than 1,000,000 and 0.05 g in 50 mL of solvent for molecular weights less than 1,000,000. The polystyrene standards were dissolved at 80° C. with gentle agitation for 30 minutes. The narrow standard mixtures are run first and in order of decreasing amount of the highest molecular weight component to minimize degradation.

The polystyrene standard peak molecular weights were converted to polyethylene molecular weights using the following equation (as described in Williams and Ward, J. Polym. Sci., Polym. Let., 6, 621 (1968)):

$$M\text{polyethylene} = A(M\text{polystyrene})^B \quad (1)$$

Here B has a value of 1.0, and the experimentally determined value of A is 0.38.

A first order polynomial was used to fit the respective polyethylene-equivalent calibration points obtained from equation (1) to their observed elution volumes. The actual polynomial fit was obtained so as to relate the logarithm of polyethylene equivalent molecular weights to the observed elution volumes (and associated powers) for each polystyrene standard.

Number, weight, and z-average molecular weights were calculated according to the following equations:

$$\overline{Mn} = \frac{\sum_i Wf_i}{\sum_i \left(\frac{Wf_i}{M_i}\right)} \quad (2)$$

$$\overline{Mw} = \frac{\sum_i (Wf_i * M_i)}{\sum_i Wf_i} \quad (3)$$

$$\overline{Mz} = \frac{\sum_i (Wf_i * M_i^2)}{\sum_i (Wf_i * M_i)} \quad (4)$$

Where, Wfi is the weight fraction of the i-th component and Mi is the molecular weight of the i-th component.

The MWD was expressed as the ratio of the weight average molecular weight (Mw) to the number average molecular weight (Mn).

The A value was determined by adjusting A value in equation (1) until Mw, the weight average molecular weight calculated using equation (3) and the corresponding retention volume polynomial, agreed with the independently determined value of Mw obtained in accordance with the linear homopolymer reference with known weight average molecular weight of 115,000 g/mol.

Trisubstituted Unsaturation Group_Determination Method (FTIR)

Pellets are pressed first to make a thick film of 0.25 mm and then pressed again to make a thin film of 0.125 mm. The film is then secured on a scan card and then sanded on both sides before being loaded on a Nicolet 6700 FTIR instrument. The area under the peak at 909 $cm^{-1}$ is integrated to obtain the value of number of trisubstituted unsaturation units per 1,000,000 C using 64 scans with resolution of 2 $cm^{-1}$. This technique has been calibrated using a known absorbance and concentration and corrects for film thickness in order to determine the concentration of the sample.

Film Testing Conditions

The following physical properties are measured on the films produced:

2% Secant Modulus—MD (machine direction) and CD (cross direction): ASTM D882-10 (average of five film samples in each direction; each sample "1 in×6 in").

MD and CD Elmendorf Tear Strength: ASTM D1922-09 (average of 15 film samples in each direction; each sample "3 in×2.5 in" half moon shape). The films of the present invention preferably have an MD tear greater than 100 g, more preferably greater than 200 g and a CD tear greater than 700 g.

MD and CD Tensile Strength: ASTM D882-10 (average of five film samples in each direction; each sample "1 in×6 in").

Dart Impact Strength: ASTM D1709-09 (minimum of 20 drops to achieve a 50% failure; typically ten "10 in×36 in" strips).

Puncture Strength: Puncture is measured on an INSTRON Model 4201 with SINTECH TESTWORKS SOFTWARE Version 3.10. The specimen size is "6 in×6 in," and six measurements are made to determine an average puncture value. The film is conditioned for 40 hours after film production, and at least 24 hours in an ASTM controlled laboratory (23° C. and 50% relative humidity). A "100 lb" load cell is used with a round specimen holder of 4 inch diameter. The puncture probe is a "½ inch diameter" polished stainless steel ball (on a 2.5" rod) with a "7.5 inch maximum travel length."

There is no gauge length, and the probe is as close as possible to, but not touching, the specimen (the probe is set by raising the probe until it touches the specimen). Then the probe is gradually lowered, until it is not touching the specimen. Then the crosshead is set at zero. Considering the maximum travel distance, the distance would be approximately 0.10 inch. The crosshead speed is 10 inches/minute. The thickness is measured in the middle of the specimen. The thickness of the film, the distance the crosshead traveled, and the peak load are used to determine the puncture by the software. The puncture probe is cleaned using a "KIM-WIPE" after each specimen.

EXAMPLES

The two examples described below are for two sets of resins, each having a similar molecular weight, with different concentrations of an alkoxy amine derivative additive. The specific additive used is 9-(acetyloxy)-3,8,10-triethyl-7,8,10-trimethyl-1,5-dioxa-9-azaspiro[5.5]undec-3-yl]methyl octadecanoate, which is added as an LDPE (resin D) masterbatch having less than 1 percent by weight of the additive, in this example having 0.56 percent by weight of the additive. Note that the ppm levels reported below refer to the amount of alkoxy amine derivative added and not the amount of the entire masterbatch added.

The LDPE resin D and the alkoxy amine derivative additive are compounded in a 30 mm co-rotating, intermeshing Coperion Werner-Pfleiderer ZSK-30 (ZSK-30) twin screw extruder to form a masterbatch. The ZSK-30 has ten barrel sections with an overall length of 960 mm and a 32 length to diameter ratio (L/D). A two-hole strand die is used without a breaker plate or screen pack. The extruder consists of a DC motor, connected to a gear box by V-belts. The 15 Hp motor is powered by a GE adjustable speed drive located in a control cabinet. The control range of the screw shaft speed is 1:10. The maximum screw shaft speed is 500 revolutions per minute. A pressure transducer is positioned in front of the die to measure die pressure.

The extruder has eight heated/cooled barrel sections along with a 30 mm spacer, which makes up five temperature controlled zones. It has a cooled only feed section and a heated only die section, which is held together by tie-rods and supported on the machine frame. Each section can be heated electrically with angular half-shell heaters and cooled by a special system of cooling channels.

The screws consist of continuous shafts on which screw-flighted components and special kneading elements are installed in any required order. The elements are held together radially by keys and keyways and axially by a screwed-in screw tip. The screw shafts are connected to the gear-shafts by couplings and can easily be pulled out of the screw barrel for dismantling.

A Conair pelletizer is used to pelletize the blends. It is a 220 volt variable speed, solid cutter unit. The variable speed motor drives a solid machined cutting wheel, which in turn drives a fixed metal roller. A movable rubber roller presses against the fixed roller and helps pull the strands by friction into the cutting wheel. The tension on the movable roller may be adjusted as necessary.

The temperatures are set in the feed zone, 4 zones in the extruder, and the die as:
  Feed: 80° C.
  Zone 1: 160° C.
  Zone 2: 180° C.
  Zone 3: 185° C.
  Zone 4: 190° C.
  Die: 210° C.

The screw shaft speed is set at 275 revolutions per minute (RPM), resulting in an output rate of 52 lb/hr.

The masterbatch defined above is dry-blended with different amounts of the LDPE resin D in order to bring the concentration of the alkoxyamine derivative to a desired level in the target resin as shown in Table 1. The masterbatch or the dry-blended material thereof is blended with LLDPE resins B or C using the following setup: the masterbatch or the dry-blended material described above is fed through a hopper into a Sterling 2½ inch single screw extruder which is used as the side arm conveyer with a rupture disc of 3200 psig. The four heating zones in the single screw extruder are set at 220° C.

The LLDPE resins B (Example 1) or C (Example 2) are fed through another hopper into a Century-ZSK-40 extruder (37.13 length-to-diameter ratio extruder, a co-rotating, intermeshing, 40 mm twin screw extruder with 150 Hp drive, 244 Armature amps (maximum), and 1200 screw rpm (maximum)). The nine heating zones in the extruder are set as follows: the first at 25° C., the second at 100° C., and the rest at 200° C.

The polymer melt pump is a Maag 100 cc/revolution pump that helps convey the molten polymer from the extruder, and through the downstream equipment. It is powered by a 15 hp motor with a 20.55/1 reduction gear. The pump is equipped with a pressure transmitter and a 5200 psi rupture disc on the inlet and outlet transition piece. There are heater zones on the melt pump and the inlet and outlet transition pieces which are set at 220° C.

The melt pump is attached to the extruder and the single screw extruder's flow enters the polymer stream through an injector from the single screw side arm extruder. The injector is a ¾ of an inch tubing protruding into the centerline of a pipe attached to the melt pump with a 3.1 inches internal diameter.

The polymer coming from the extruder is blended with the single screw extruder resin as it flows through a static mixer with 18 Kenics mixing elements inside a pipe of 3.1 inch internal diameter. The mixing elements have a 1.3 length-to-diameter ratio. There are seven heating zones in the static mixer and are all set to 220° C.

The combined flow then flows through a Gala pelletizer system. The Gala is equipped with a 12 hole (2.36 mm diameter holes) Gala die with four of the holes plugged. The cutter has a four blade hub and operates at approximately 800 ppm. The water temperature in the pelletizer is kept at 30° C.

The amount of the masterbatch or dry-blended masterbatch and resin D is approximately 3 percent by weight of the total resin amount. The residence time of the masterbatch in the side arm extruder is approximately 20 minutes and the residence time of the polymer in the static mixer is approximately 3 minutes.

The melt strength of each of these examples is measured using Göttfert Rheotester 2000 at 190° C. The viscosity is measured using a constant temperature of 190° C. at a frequency sweep in a TA Instruments "Advanced Rheometric Expansion System (ARES)". The melt indices are measured using ASTM method D-1238 at 190° C. using a Tinius-Olsen Extrusion Plastometer Model MP987. The molecular weights are determined using the method described under Testing Methods above.

Resin Description:

Resin A (Dowlex XUX 61528.20) is a Ziegler-Natta catalyzed polyethylene resin made in a solution process having melt index of 0.5 g/10 min (at 190° C., 2.16 kg ASTM D-1238) and a density 0.917 g/cm$^3$ (ASTM D792).

Resin B (Dowlex TG 2085B) is a Ziegler-Natta catalyzed polyethylene resin made in a solution process having a melt index of 0.95 g/10 min (at 190° C., 2.16 kg ASTM D-1238_ and a density 0.919 g/cm$^3$ (ASTM D792).

Resin C (Dowlex NG 5085B) is a Ziegler-Natta catalyzed polyethylene made in a slurry process having a melt index of 1.3 g/10 min (at 190° C., 2.16 kg ASTM D-1238) and a density of 0.918 g/cm$^3$ (ASTM D792).

Resin D (LDPE 208C/206M) is a homopolymer ethylene resin made in a high-pressure tubular reactor having a melt index of 0.7 g/10 min (at 190° C., 2.16 kg ASTM D-1238) and a density of 0.925 g/cm$^3$ (ASTM D792).

Resin E is a Ziegler-Natta catalyzed polyethylene resin made in a solution process having melt index of 1.0 g/10 min (at 190° C., 2.16 kg ASTM D-1238) and a density 0.920 g/cm$^3$ (ASTM D792).

Resin F (LDPE 132i) is a homopolymer ethylene resin made in a high-pressure tubular reactor having a melt index of 0.25 g/10 min (at 190° C., 2.16 kg ASTM D-1238) and a density of 0.922 g/cm$^3$ (ASTM D792).

Resin G (LDPE 204M) is a homopolymer ethylene resin made in a high-pressure tubular reactor having a melt index of 0.3 g/10 min (at 190° C., 2.16 kg ASTM D-1238) and a density of 0.920 g/cm$^3$ (ASTM D792).

White masterbatch is a homopolymer ethylene resin made in a high-pressure tubular reactor having a melt index of 13 g/10 min (at 190° C., 2.16 kg ASTM D-1238) with 60 percent by weight of $TiO_2$ as a white pigment.

Black masterbatch is a homopolymer ethylene resin made in a high-pressure tubular reactor having a melt index of 13 g/10 min (at 190° C., 2.16 kg ASTM D-1238) with 60 percent by weight of carbon black as a black coloring agent.

Production of Films

Example 3

Films are made using resins produced in Examples 1 and 2 above on a Sterling extruder with 3.5 inches in diameter with a 30:1 length-to-diameter ratio and a 6 inch die with a linear low density (LLDPE) type screw with internal as well as external cooling. Films are made of 100% of the samples in this example.

General blown film extruder parameters used to produce the blown films for the LLDPE-rich films are shown in Table 1. All resins shown contain 3 wt % of resin D. The temperatures in Table 1 show the temperatures closest to the pellet hopper (Barrel 1) and in increasing order as the polymer is being extruded through the die (upper die). Film properties for some resins (control and respective inventive resin) are shown in Table 2.

Example 4

A target resin is produced by incorporating an alkoxy amine derivative additive in a two-step process. The specific additive used is 9-(acetyloxy)-3,8,10-triethyl-7,8,10-trimethyl-1,5-dioxa-9-azaspiro[5.5]undec-3-yl]methyl octadecanoate, which is added as an LDPE (resin D) masterbatch having less than 1 percent by weight of the additive, in this example having 0.1520 percent by weight of the additive.

First a concentrate is made with LDPE resin D and the alkoxy amine derivative additive in a 30 mm co-rotating, intermeshing Coperion Werner-Pfleiderer ZSK-30 (ZSK-30) twin screw extruder to form a masterbatch. The ZSK-30 has ten barrel sections with an overall length of 960 mm and a 32 length to diameter ratio (L/D). A two-hole strand die is used without a breaker plate or screen pack. The extruder consists of a DC motor, connected to a gear box by V-belts. The 15 Hp motor is powered by a GE adjustable speed drive located in a control cabinet. The control range of the screw shaft speed is 1:10. The maximum screw shaft speed is 500 revolutions per minute. A pressure transducer is positioned in front of the die to measure die pressure.

The extruder has eight heated/cooled barrel sections along with a 30 mm spacer, which makes up five temperature controlled zones. It has a cooled only feed section and a heated only die section, which is held together by tie-rods and supported on the machine frame. Each section can be heated electrically with angular half-shell heaters and cooled by a special system of cooling channels.

The screws consist of continuous shafts on which screw-flighted components and special kneading elements are installed in any required order. The elements are held together radially by keys and keyways and axially by a screwed-in screw tip. The screw shafts are connected to the gear-shafts by couplings and can easily be pulled out of the screw barrel for dismantling.

A Conair pelletizer is used to pelletize the blends. It is a 220 volt variable speed, solid cutter unit. The variable speed motor drives a solid machined cutting wheel, which in turn drives a fixed metal roller. A movable rubber roller presses against the fixed roller and helps pull the strands by friction into the cutting wheel. The tension on the movable roller may be adjusted as necessary.

The temperatures are set in the feed zone, 4 zones in the extruder, and the die as:
Feed: 80° C.
Zone 1: 160° C.
Zone 2: 160° C.
Zone 3: 160° C.
Zone 4: 160° C.
Die: 160° C.

The screw shaft speed is set at 275 revolutions per minute (RPM), resulting in an output rate of 50 lb/hr.

The above concentrate is further incorporated in resin E using 4 weight percent of the concentrate to produce a target resin E with 60 parts per million by weight of the additive. For this compounding step a co-rotating twin screw Leistritz extruder is used with length to diameter ratio of 40 and screw diameter of 75 mm. The maximum output is 600 kg per hour. There are eight heater zones in the extruder and two heating zones in the die as follows:
Feed: 80° C.
Zone 1: 180° C.
Zone 2: 190° C.
Zone 3: 200° C.
Zone 4: 200° C.
Zone 5: 210° C.
Zone 6: 220° C.
Zone 7: 220° C.
Zone 8: 220° C.
Die zone 1: 220° C.
Die zone 2: 220° C.

A Gala underwater pelletizer with 2500 rpm and 30° C. water temperature is used to pelletize the resin.

The target resin compounded as described above is referred to as resin E with 60 ppm additive.

Films are made using a typical silobag extruder machine and a three-layer blown film line with a layer distribution of 55%/27%/18%, with corresponding screw diameters of 150/120/90 mm; the central screw has a typical LDPE design and the die diameter is 43 inches. BUR is 2.5:1, with internal bubble cooling and machine output of 950 to 1050 kg/hr. The film thickness is 235 microns. The start up formulation has an overall proportion of 52.02% resin G (LDPE 204M) and 33.20% resin E, the rest of the formulation (14.78%) is composed of white or black masterbatches and scrap from the process. None of the masterbatch or scrap types of materials or proportions thereof are changed during the trials.

The materials are distributed on the three layers as following:
Layer A (55%): 54% Resin G+35% Resin E+11% white Masterbatch
Layer B (27%): 57% Resin G+15% Resin E+28% Scrap
Layer C (18%): 38.5% Resin G+55% Resin E+6.5% black Masterbatch The experiments are conducted replacing the standard LLDPE resin E by the target LLDPE with high melt strength (Resin E+60 ppm of additive). Case 1 is used as a control. Cases 2 and 3 are designed to test bubble stability with increased amounts of the LLDPE resin.

Case #1: all of resin E in the external skin (Layer A) is replaced by target resin E compounded at 235° C. with 60 ppm of the additive. The amperage increases temporarily in this extruder but is reduced smoothly at the original level and good bubble stability is obtained. This is the control case and it is used to verify that there are no variations when compared to the standard LLDPE case.

Case #2: the formulation is changed in the Layer A by replacing resin E with the compounded resin E with 60 ppm additive, increasing this resin by 15%, and reducing resin G accordingly. The amperage increases from 81 to 100, overpassing the safety limit of this extruder. Temperature profile is increased by 10-15° C. to reduce amperage. This is used as an intermediate step to determine the limit for this extruder when a portion of resin E is replaced in one of the three layers.

Case #3: the same formulation as in Case #2, but in addition, 10% of resin E at Layer C is replaced by the compounded resin E with 60 ppm additive. The pressure increases until the machine's limit is reached and it is the final formulation. Good bubble stability with the new formulation is achieved. The final improved formulation is:
Layer A (55%): 39% Resin G+50% Resin E+60 ppm additive+11% white masterbatch
Layer B (27%): 57% Resin G+15% Resin E+28% Scrap
Layer C (18%): 38.5% Resin G+45% Resin E+10% (Resin E+60 ppm additive)+6.5% black masterbatch The effect of increment on LLDPE portion can be noticed by the mechanical properties measurements. The results are described on Table 3. The Elmendorf MD Tear is a critical property for the application and it is increased by 13% as the LLDPE to LDPE ratio in the blend is increased. The trials results at the end demonstrate that the compounded LLDPE with additive could deliver better mechanical properties without loosing bubble stability and, therefore, keeping the same machine output.

FIG. 1 shows the melt strength curve versus stretching velocity with increasing additive concentration. The incorporation of the additive changes the behavior of Resin B, increasing the force needed to stretch the molten polymer. All samples are compounded of the indicated resins with 3 wt % of resin D.

Figure 2:
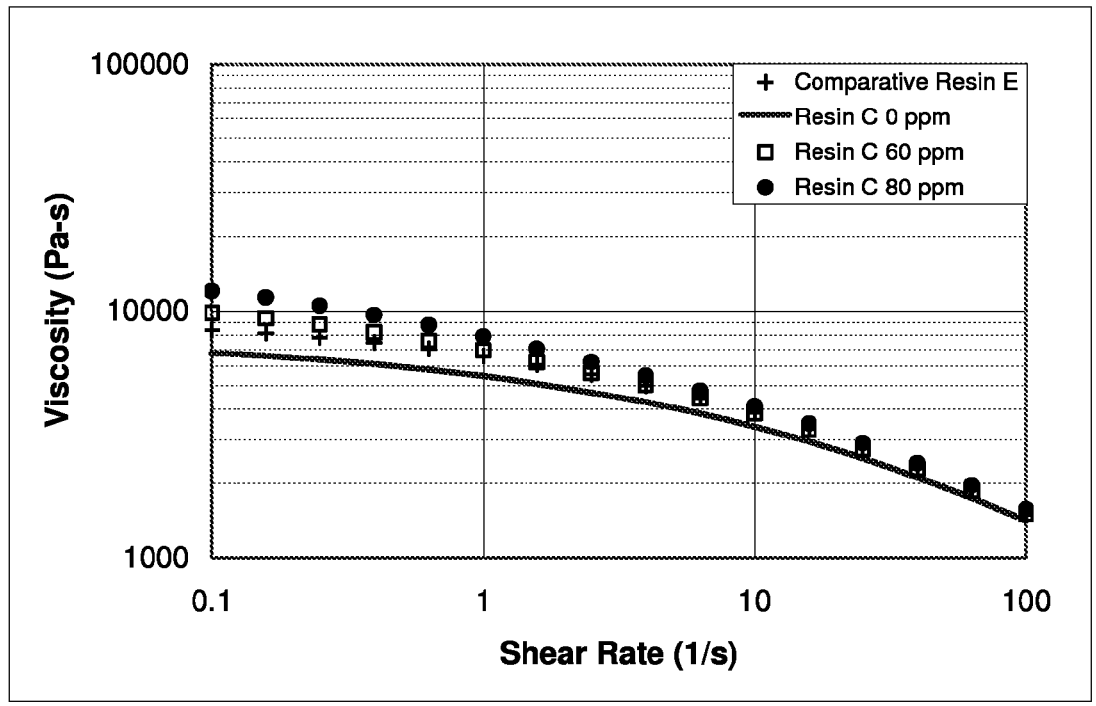
FIG. 2 shows the viscosity versus the shear rate frequency measured using a constant temperature of 190° C. at a frequency sweep in a TA Instruments "Advanced Rheometric Expansion System (ARES)".

FIG. 2 shows the viscosity versus the shear rate frequency measured using a constant temperature of 190° C. at a frequency sweep in a TA Instruments "Advanced Rheometric Expansion System (ARES)". The incorporation of the additive changes the behavior of Resin C at low shear rates as compared to resin E. All resins contain 3 wt % of resin D.

Figure 3:
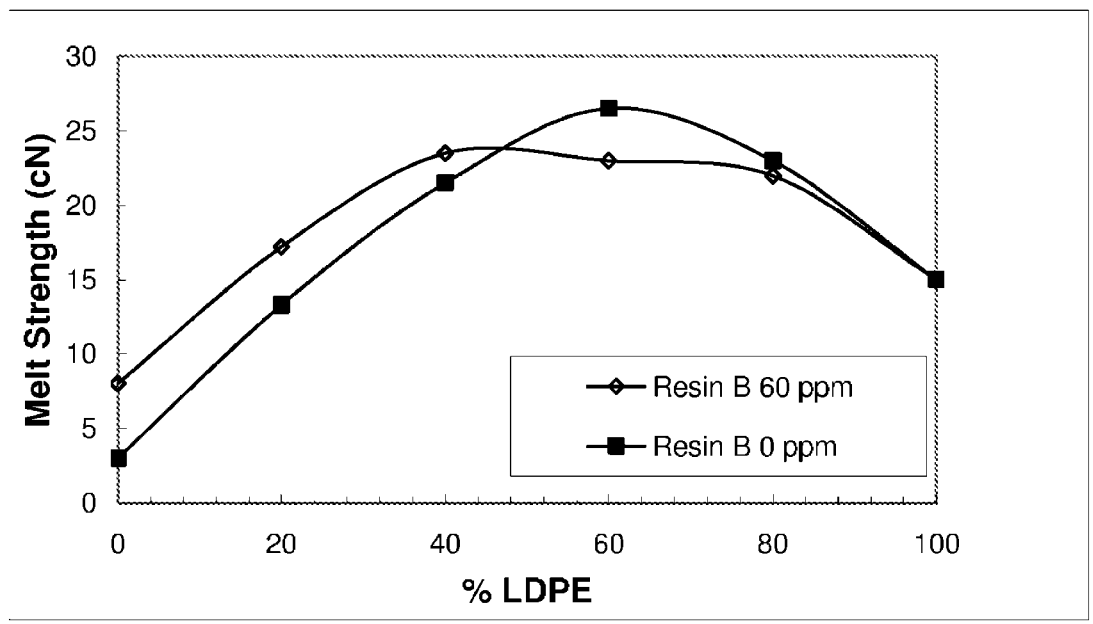
FIG. 3 shows the melt strength of blends of inventive and comparative resin versus the amount of LDPE resin F.

FIG. 3 shows the melt strength of blends of inventive and comparative resin versus the amount of LDPE resin F. For LDPE amounts in the blend of less than 50 wt %, the inventive resin with the additive exhibits higher melt strength than the comparative resin with no additive. Both resin samples contain 3 wt % of LDPE resin D.

TABLE 1

Blown film process parameters used to produce all films. All resins also contain 3 w % of resin D.

| Description | Example 1 (Resin B + LDPE208C) | Example 1 + 30 ppm | Example 1 + 60 ppm | Example 2 (Resin C + LDPE208C) | Example 2 + 60 ppm | Example 2 + 80 ppm |
|---|---|---|---|---|---|---|
| Speed (rpm) | 18.9 | 18.9 | 19.1 | 18.1 | 18.8 | 18.8 |
| Rate (lb/hr) | 152 | 151 | 151 | 147 | 151 | 151 |
| Rate/rpm | 8.04 | 7.99 | 7.91 | 8.12 | 8.03 | 8.03 |
| Barrel P1 (psi) | 3010 | 3210 | 3120 | 2590 | 2770 | 2840 |
| Barrel P2 (psi) | 4190 | 4370 | 4370 | 3510 | 3730 | 3840 |
| Barrel P3 (psi) | 4410 | 4570 | 4680 | 3590 | 3870 | 4040 |
| Screen P (psi) | 4320 | 4450 | 4580 | 3500 | 3790 | 3950 |
| Adapter P (psi) | 3040 | 3080 | 3190 | 2370 | 2610 | 2670 |
| Melt Temp (F.) | 456 | 457 | 457 | 457 | 456 | 457 |
| Barrel T1 (F.) | 378 | 374 | 375 | 375 | 375 | 375 |
| Barrel T2 (F.) | 427 | 420 | 420 | 420 | 420 | 420 |
| Barrel T3 (F.) | 396 | 389 | 390 | 389 | 390 | 391 |
| Barrel T4 (F.) | 379 | 375 | 375 | 375 | 375 | 377 |
| Barrel T5 (F.) | 381 | 375 | 375 | 374 | 375 | 375 |
| Screen T (F.) | 424 | 440 | 445 | 444 | 445 | 446 |
| Adapter T (F.) | 450 | 450 | 450 | 450 | 450 | 450 |
| Block T (F.) | 456 | 450 | 450 | 450 | 450 | 451 |
| Lower Die T (F.) | 452 | 450 | 450 | 450 | 450 | 450 |
| Inner Die T (F.) | 191 | 186 | 189 | 188 | 185 | 184 |
| Upper Die T (F.) | 451 | 452 | 450 | 450 | 450 | 450 |

TABLE 2

Film properties of some films produced per conditions shown in Table 1.

| Description | Resin B | Standard deviation | Resin B w/60 ppm | Standard deviation | Resin C | Standard deviation | Resin C w/80 ppm | Standard deviation |
|---|---|---|---|---|---|---|---|---|
| Melt Index (g/10 min) | 0.95 | 0.05 | 0.69 | 0.05 | 1.3 | .05 | 1.00 | 0.05 |
| Density (g/cm³) | 0.919 | 0.002 | 0.919 | 0.002 | 0.918 | 0.002 | 0.918 | 0.002 |
| Melt Strength (cN@Plateu) | 4.8 | | 6.4 | | 3.5 | | 5.5 | |
| Thickness (mil) | 1.43 | 0.052 | 1.37 | 0.082 | 1.27 | 0.045 | 1.42 | 0.027 |
| Puncture (ft*lbf/in^3) | 113 | 18 | 130 | 23 | 120 | 18 | 125 | 21 |
| Dart (g) | 235 | | 235 | | 262 | | 283 | |
| Modulus Secant CD 2% (psi) | 29942 | 1042 | 29016 | 494 | 26129 | 1312 | 27033 | 1292 |
| Modulus Secant MD 2% (psi) | 26158 | 806 | 27241 | 365 | 24144 | 469 | 23560 | 568 |
| Tensile CD | | | | | | | | |
| Peak Load (lbf) | 5.2 | 1.2 | 6.5 | 0.4 | 5.2 | 0.4 | 5.3 | 0.9 |
| Strain at Break (%) | 604 | 36 | 634 | 17 | 624 | 5 | 603 | 40 |
| Stress at Yield (psi) | 1581 | 39 | 1599 | 72 | 1544 | 16 | 1521 | 40 |
| Tensile MD | | | | | | | | |
| Peak Load (lbf) | 7.6 | 1.1 | 7.9 | 1.0 | 6.6 | 0.8 | 7.4 | 1.0 |
| Strain at Break (%) | 515 | 22 | 494 | 14 | 541 | 15 | 510 | 39 |
| Stress at Yield (psi) | 1619 | 99 | 1644 | 40 | 1590 | 55 | 1560 | 142 |
| Elmendorf Tear MD (g) | 457 | 64 | 404 | 58 | 530 | 83 | 391 | 92 |
| Elmendorf Tear CD (g) | 884 | 78 | 931 | 50 | 807 | 43 | 897 | 46 |

TABLE 3

Mechanical properties of films from Example 4 - Silobag films

| | Original formulation | | Case #3—Improved Formulation | |
|---|---|---|---|---|
| | Average | Std Dv | Average | Std Dv |
| Thickness (average), μ | 237 | 5 | 237 | 6 |
| Secant Modulus, 2%, MD, MPa | 190 | 7 | 189 | 10 |
| Secant Modulus, 2%, CD, MPa | 200 | 2 | 199 | 3 |
| Strength @ Break, MD, MPa | 26.8 | — | 26.7 | — |
| Elongation @ Break, MD, % | 1010 | — | 972 | — |
| Strength @ Yield, MD, MPa | 11.8 | — | 11.6 | — |
| Strength @ Break, CD, MPa | 24.7 | — | 25.7 | — |
| Elongation @ Break, CD, % | 1107 | — | 1098 | — |
| Strength @ Yield, CD, MPa | 11.4 | — | 11.6 | — |
| Elmendorf Tear, MD, g | 2149 | 161 | 2633 | 186 |
| Elmendorf Tear, CD, g | >3840 | — | >3840 | — |

The following embodiments are expressly considered to be part of the present invention although each embodiment may not be separately claimed.

Although the invention has been described in considerable detail through the preceding description and examples, this detail is for the purpose of illustration and is not to be construed as a limitation on the scope of the invention as it is described in the appended claims. All United States patents, published patent applications and allowed patent applications identified above are incorporated herein by reference.

We claim:

1. A film having a thickness greater than 100 microns comprising:
   a) from 10 to 100 percent by weight of a polyethylene polymer made by the process of:
      i) selecting a target polyethylene resin having a density, as determined according to ASTM D792, in the range of from 0.90 g/cm³ to 0.955 g/cm³, and a melt index, as determined according to ASTM D1238 (2.16 kg, 190° C.), in the range of from 0.01 g/10 min to 10 g/10 min;
      ii) reacting said target polyethylene with an alkoxy amine derivative in an amount less than 900 parts derivative per million parts by weight of total polyethylene resin under conditions sufficient to increase the melt strength of the target polyethylene resin; and
   b) from 0 to 90 percent by weight of a low density polyethylene composition;
   wherein said target polyethylene has a molecular weight distribution, Mw/Mn, of less than about 5.

2. The film of claim 1 wherein the alkoxy amine derivative corresponds to the formula:

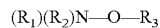

where $R_1$ and $R_2$ are each independent of one another, hydrogen, $C_4$-C42 alkyl or $C_4$-C42 aryl or substituted hydrocarbon groups comprising O and/or N, and where $R_1$ and $R_2$ may form a ring structure together; and $R_3$ is hydrogen, a hydrocarbon or a substituted hydrocarbon group comprising O and/or N.

3. The film of claim 1 wherein said target polyethylene has a density in the range of from 0.908 to 0.935 g/cm3.

4. The film of claim 1, wherein said target polyethylene has a melt index in the range of 0.01 to 3 g/10 minutes.

5. The film of claim 1, wherein said film has MD tear greater then 100 g and a CD tear greater than 700 g.

6. The film of claim 1, wherein the melt flow ratio of $I_{10}/I_2$ of the target polyethylene is greater than 8.9.

7. The film of claim 1, wherein [Viscosity at 0.1 rad/s]/[Viscosity at 100 rad/s] of the target polyethylene measured at 190° C. is greater than 6.5.

8. The film of claim 1, wherein tan delta at 0.1 rad/s of the target polyethylene measured at 190° C. is less than 5.5.

9. The film of claim 1, wherein melt strength of the target polyethylene measured at 190° C. is greater than 4.5 cN.

10. The film of claim 1, wherein the film is produced by blown film extrusion process.

11. The film of claim 1, wherein said target polyethylene presents higher melt strength after reaction with an alkoxy amine derivative than a comparable resin which has not been reacted with an alkoxy amine derivative.

12. The film of claim 1 wherein the target polyethylene comprises a blend of two or more of LDPE, HDPE and LLDPE at different proportions.

13. The film of claim 1 wherein the film comprises a blend of two or more of LDPE, HDPE and LLDPE, wherein at least one of the blend components has been not been reacted with an alkoxy amine derivative.

14. The film of claim 12, wherein the concentration of LDPE is at least 10% by weight lower than blends having a similar melt strength which do not contain any linear polyethylene which has been reacted with an alkoxy amine derivative.

* * * * *